Figure 1:
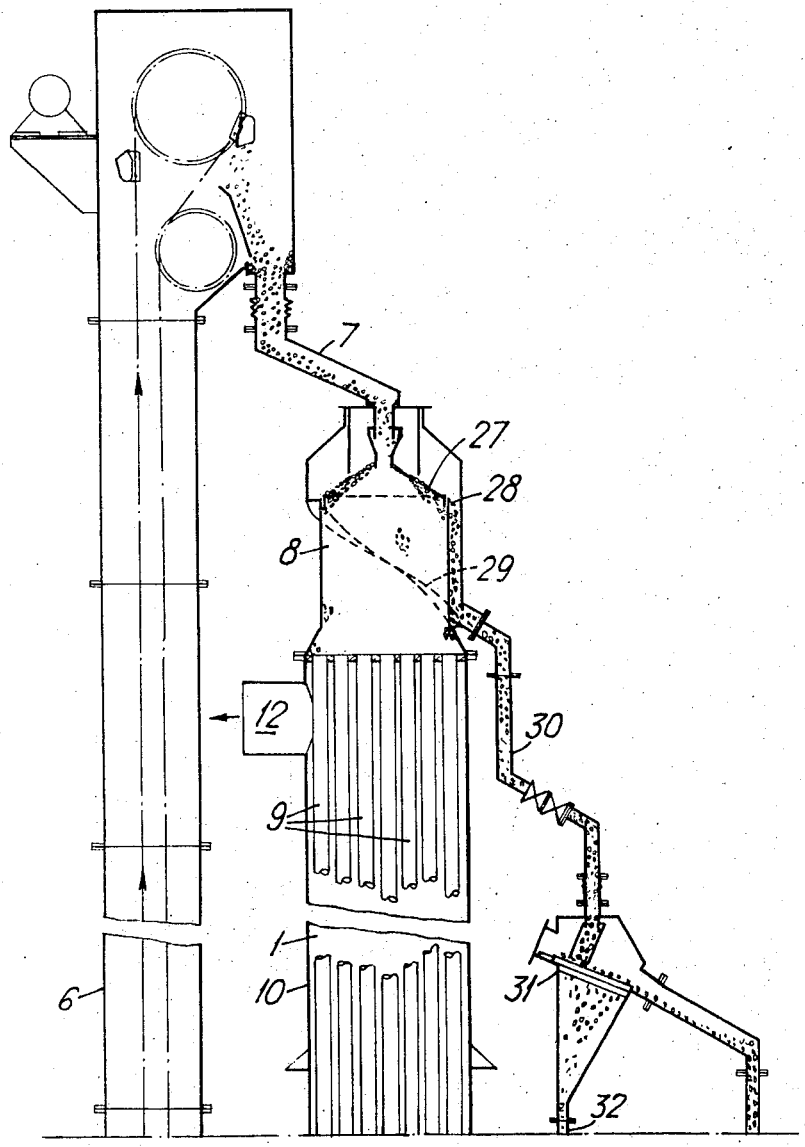

United States Patent [19]
Forman

[11] 3,826,225
[45] July 30, 1974

[54] CARBONYL PELLET DECOMPOSER
[75] Inventor: Henry Ronald Forman, Swansea, Wales
[73] Assignee: The International Nickel Company, Inc., New York, N.Y.
[22] Filed: Dec. 21, 1972
[21] Appl. No.: 317,164

Related U.S. Application Data
[62] Division of Ser. No. 156,442, June 24, 1971, abandoned.

[52] U.S. Cl.................. 118/48, 23/284, 117/100 M, 118/DIG. 5
[51] Int. Cl............................................. C23c 13/02
[58] Field of Search............................. 118/48–49.5, 118/DIG. 5, 303, 24, 309; 117/100 R, 100 A, 100 B, 100 M, 100 C, 100 D, 100 S, 107.2 R, DIG. 6; 23/284, 288.3 G

[56] References Cited
UNITED STATES PATENTS
3,259,565  7/1966  Kimberlin, Jr.................. 23/284 X FOREIGN PATENTS OR APPLICATIONS
620,287  3/1949  Great Britain...................... 118/48

Primary Examiner—Morris Kaplan

[57] ABSTRACT

Contamination of nickel pellets with carbon is minimized by thermally decomposing nickel carbonyl contained in a nickel-carbonyl-containing gas which is passed counter-current to preheated pellets in a reaction chamber by withdrawing a preponderant part of the gas from the reaction chamber before the gas reaches the hottest pellets and while the gas still contains at least about 3 grams per cubic meter of nickel as nickel carbonyl and withdrawing the remainder of the gas after substantially all the nickel carbonyl therein has been decomposed to provide a nickel-carbonyl-free gas and recirculating the nickel-carbonyl-free gas through the reactor.

7 Claims, 2 Drawing Figures

CARBONYL PELLET DECOMPOSER

The present application is a division of my application Ser. No. 156,442 filed June 24, 1971, now abandoned.

In the Mond process for producing nickel through the formation and subsequent decomposition of nickel carbonyl, the carbonyl is brought into contact in a decomposer with nickel pellets heated to a temperature above the decomposition temperature of the carbonyl. The nickel is deposited on the pellets, which are circulated and, when they are big enough, are separated and removed as product.

In British Pat. No. 620,287, a modification of the Mond process for decomposing nickel carbonyl is described. The modification described in the British patent is particularly suitable for decomposing carbonyl-containing gases containing 4 percent or more of nickel carbonyl, which tend to deposit carbon if they come into contact with nickel pellets at a high temperature. In this modification nickel pellets are preheated and caused to flow in counter-current to the carbonyl-containing gas, the initial composition of the carbonyl, the rate of flow of the gas and the initial temperature of the pellets being correlated to eliminate carbon deposition wholly or substantially wholly. In carrying out the process, the preheated pellets are progressively cooled by the endothermic reaction with the carbonyl flowing counter-current to them, so that the hottest pellets entering the decomposer only come into contact with the weakest gases.

In British Pat. No. 620,287 the thermal decomposition of nickel carbonyl is described as being carried out so as to decompose the carbonyl completely, and part of the resulting nickel-free carbon monoxide is removed to a point in the path of the pellets beyond that at which the carbonyl-containing gas first comes into contact with the pellets, in order to set up a back pressure to counteract any tendency for the carbonyl to pass out of the reaction chamber with the pellets instead of flowing in the opposite direction to them.

If the pellets are preheated to a high enough temperature to ensure that the whole of the carbonyl in all the gas entering the reaction chamber is decomposed there is a tendency for some of the pellets to be over-heated, so that some carbon is formed when the gas comes into contact with the hottest pellets. Although attempts were made to overcome the foregoing difficulties and other disadvantages, none, as far as I am aware, was entirely successful when carried into practice commercially on an industrial scale.

It has now been discovered that contamination of carbonyl nickel pellets with carbon can be minimized in the thermal decomposition of nickel carbonyl in specially designated apparatus for controlling the extent of nickel carbonyl decomposition.

Another object of the invention is to provide apparatus for thermally decomposing nickel carbonyl into pellets in which the extent of carbonyl decomposition can be controlled to minimize contamination of the pellets with carbon.

Figure 2:
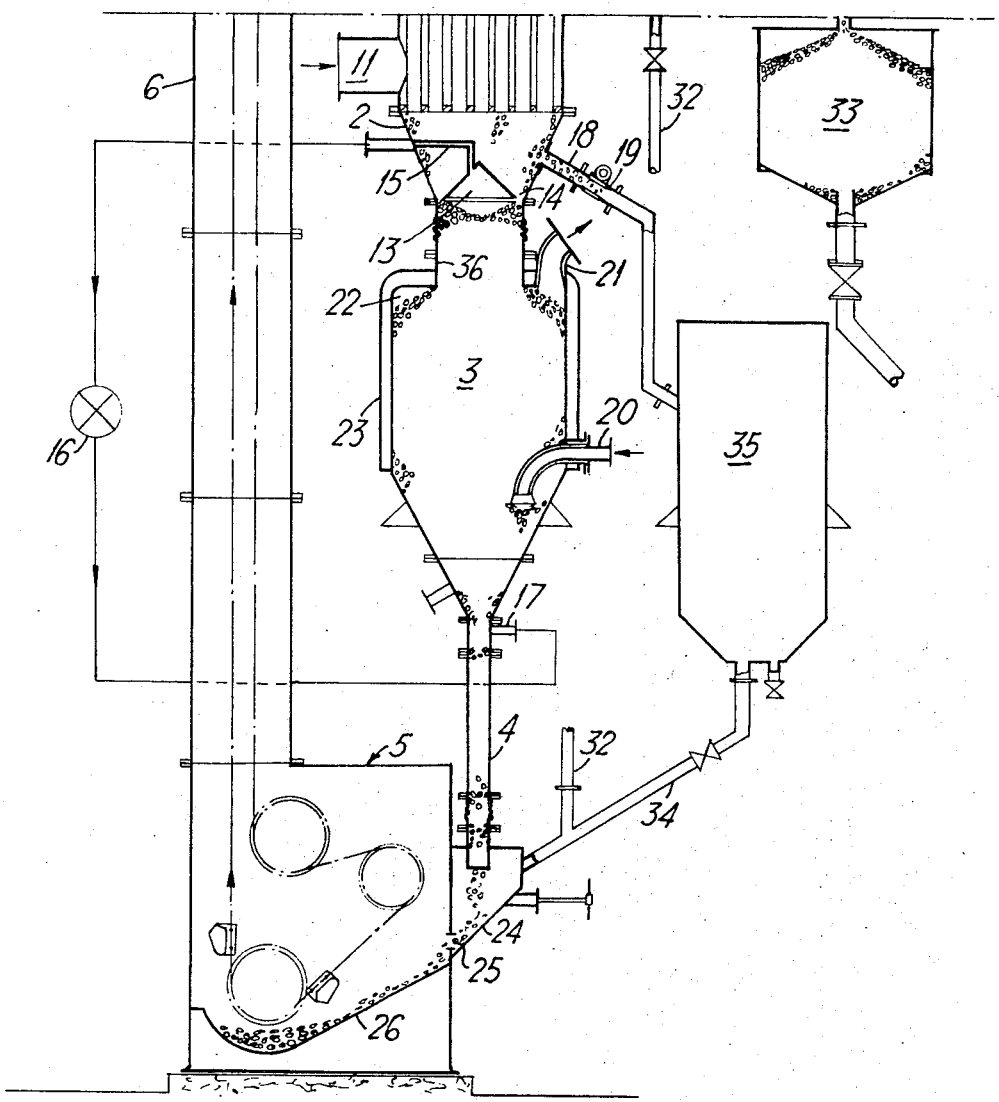

Other objects and advantages will become apparent from the following description taken in conjunction with the accompanying drawing in which:

FIG. 1 is a diagrammatic sectional elevation of the upper part of a complete carbonyl decomposer, and FIG. 2 is a sectional elevation of the lower part of the decomposer.

Generally speaking, the present invention contemplates a process for decomposing nickel carbonyl. A reaction zone is established in a reactor. Nickel pellets preheated to nickel carbonyl decomposing temperatures are fed to the pellet charging end of the reactor and flow to the other pellet discharging end where the pellets are discharged in a cooled condition. A nickel carbonyl-containing gas is fed to the reactor and is controlled to flow countercurrent to the pellets so that nickel is deposited on the pellets by the thermal decomposition of nickel carbonyl. A preponderant part of the nickel-carbonyl containing gas is withdrawn from the reactor while the gas still contains at least about 3 grams per cubic meter ($g/M^3$) of nickel as nickel carbonyl to minimize production of carbon. The remainder of the nickel-carbonyl containing gas is treated in the reactor to substantially completely decompose the nickel carbonyl to provide a carbonyl-free gas that is recirculated to the reactor at the pellet discharging end to create a back pressure in the reactor to insure that the carbonyl-containing gas flows countercurrently to the pellets.

Advantageously, contamination of the pellets with carbon is minimized by withdrawing a preponderant part (e.g., at least about 95 percent or advantageously between about 97 percent and 99 percent of the gas) of the gas from the reaction chamber before it reaches the hottest pellets and while it still contains at least 3 $g/M^3$ of nickel as nickel carbonyl, withdrawing substantially carbonyl-free gas from a point in the path of the hot pellets immediately before they enter the reaction chamber, returning it to the chamber at a point in the path of the pellets beyond that at which the carbonyl-containing gas first comes into contact with the pellets, and circulating this gas countercurrent to the pellets.

In the interest of efficiency of operation the amount of undecomposed carbonyl in the gases withdrawn from the reaction chamber should be as small as possible, and in practice the nickel content of the gases should be from about 3 to 6 $g/M^3$ and most advantageously about 5 $g/M^3$.

It is advantageous to use a vertical decomposer, the preheated pellets entering the reaction chamber at the top, moving downwards under the influence of gravity and being removed from the bottom.

The reaction chamber conveniently has a cylindrical body and a narrower neck in the center of the top through which the pellets enter. In use this neck is full of pellets, while the cylindrical body is not completely filled, as the surface of the mass of pellets in it slopes downwards and outwards from the junction of the neck and body, leaving a gas space around the shoulder of the cylinder. The carbonyl-containing gas is introduced into the lower part of the chamber, passes upwards through the mass of pellets, and is substantially all withdrawn through outlets leading from the gas space in the shoulder while it still contains some undecomposed carbonyl. The remaining carbonyl in any small amount of gas that diffuses upwards through the neck of the reaction chamber is decomposed by the hot pellets entering the neck from the preheater.

In practice the nickel pellets whould be preheated to between about 200° and 250° C, e.g., about 220° C. In passing down the reaction chamber to the level at which the main part of the gases are withdrawn the pellets lose very little heat. As they pass on down the reaction chamber the pellets are cooled by the endothermic decomposition of the carbonyl, and the pellets leave the chamber at between about 170° and 210° C, e.g., at about 180° C.

In most instances, the feed nickel-carbonyl-containing gas will be carbon monoxide containing at least about 4 percent (approximately 100 g/M³ nickel as nickel carbonyl), by volume, nickel carbonyl. Best results, in terms of high throughput rates and overall efficiency, are realized by employing carbon monoxide containing, by volume, between about 5 percent (approximately 125 g/M³ nickel as nickel carbonyl) and 20 percent (approximately 500 g/M³ nickel as nickel carbonyl) or even more e.g., up to 40 percent (approx. 1000 g/M³ nickel as nickel carbonyl.) nickel carbonyl.

Although the gases diffusing upwards through the pellets in the neck of the reaction chamber are not exposed to much higher temperatures than the main part of the gases, the velocity of diffusion is so low that there is adequate time for virtually complete decomposition of the residual carbonyl in the gas to take place.

The carbonyl-free gas is advantageously withdrawn through a collector placed immediately above the neck of the decomposer, compressed and returned to the bottom of the decomposer below the point at which the carbonyl-containing gases are introduced.

Referring now to the FIGS. 1 and 2 of the drawings, the apparatus comprises a pellet preheater 1, mounted above and connected through a pellet collection chamber 2 to a reaction vessel 3 having a tail pipe 4 leading to the boot 5 of a totally enclosed bucket elevator 6 arranged to collect nickel pellets that have come from the reaction chamber through the tail pipe, raise them to the top of the apparatus and discharge them through a pipe 7 into a pellet reservoir 8 above the preheater 1.

Nickel pellets from the reservoir 8 at a temperature of approximately 180° C. pass down through the vertical tubes 9 of the preheater and are heated to approximately 220° C. by hot gases circulating through the heating jacket 10 surrounding the tubes from an inlet 11 to an outlet 12. The pellets discharged from the pipe 7 into the reservoir have sizes ranging from very small seed particles up to about three-eighths inch, and the larger pellets tend to segregate to the outside of the mass in the reservoir and pass down the outer tubes of the preheater.

From the bottom of the tubes 9, the pellets enter the frusto-conical collecting chamber 2, the walls of which are inclined to the vertical at about 23°. Mounted inside this chamber is a baffle 13 in the form of a hollow inverted 90° cone which serves to retard the passage of the pellets down the inner tubes of the preheater. The baffle 13 and the inwardly sloping walls of the collecting chamber co-operate to guide the smaller pellets from the inner tubes of the preheater outwards and the larger pellets from the outer tubes inwards so that they are mixed and pass together through the annular opening 14 into the top of the decomposer 3. This opening is about 2 inches wide.

A pipe 15 leads from the interior of the conical baffle 13 via a compressor 16 to a gas inlet 17 at the top of the tail pipe of the decomposer, and three equidistantly spaced outlet pipes 18 lead from the collecting chamber to an emergency pellet drain vessel 35 via magnetic valves 19, which are normally closed. Only one of the pipes 18 and valves 19 is shown in the drawing. Drain pipe 34 leads from emergency drain vessel 35 to hopper 24.

A mixture of carbon monoxide gas and about 10 to 12 percent, by volume, nickel carbonyl is introduced into the lower part of the reaction vessel through water-jacketed inlet pipes 20, of which only one is shown, having flared ends opening downwards into the mass of pellets. This arrangement reduces the pressure differential at the end of the tube and a gas space is formed below the end of the tube as the mass of pellets moves downwards past it.

The gas from the inlets 20 passes upwards through the mass of hot pellets which decompose the nickel carbonyl to form nickel which is deposited on the pellets and causes them to grow. At the same time the pellets are cooled by the endothermic reaction so that the gas progressively comes into contact with hotter pellets as its carbonyl content decreases. A preponderant part (about 98 percent) of the carbonyl-containing gas, sill containing about 0.15 percent by volume, (about 4 g/M³ nickel as nickel carbonyl) of undecomposed carbonyl, is withdrawn through outlet tubes 21 communicating with an annular gas space 22 that is formed around the shoulder of the reaction vessel as the pellets move downwards from the bottom of the neck 36 of the vessel.

The outlet tubes 21 are waterjacketed to prevent decomposition of the carbonyl and are smooth inside to reduce turbulence of the gas to a minimum until it has been cooled below the decomposition temperature. The body of the reaction chamber is also surrounded by a waterjacket 23 through which hot water at 90° C. is circulated to prevent decomposition of carbonyl to form a sheet of nickel on the wall of the vessel. Surprisingly, this leads to little loss of heat from the mass of pellets, since flow of the pellets is substantially laminar.

The remaining small amount of gases passes at a very low superficial velocity up through the neck of the vessel, where it comes into contact with the hottest pellets from the preheater. This decomposes the remaining small proportion of nickel carbonyl and the resulting substantially carbonyl-free carbon monoxide gas is withdrawn through the pipe 15 from the space under the cone 13 together with carbon monoxide that has passed down through the preheater. The gas that has followed this latter route constitutes the major part of that withdrawn from under the cone, and the flow of this gas downwards through the annular opening 14 sets up a back pressure which helps to prevent upward diffusion of carbonyl-containing gas from the reaction vessel. The gas withdrawn from the hollow cone is compressed by the compressor 16 and returned through the inlet 17 to the top of the tail pipe 4. The pressure of the gas and the dimensions of the tail pipe are such that the back pressure prevents the carbonyl-containing gases from the inlets 20 from passing through the tail pipe with the pellets. The gas introduced at 17 percolates up the elevator trunking and down again through the pellet reservoir and preheater back to the hollow cone 13.

The rate of flow of the pellets through the system is controlled by means of a gate valve (not shown) at the foot of the tail pipe.

The pellets leaving the tail pipe fall into a hopper 24 down which they pass through an aperture 25 on to an inclined plate 26 leading to the bottom of the elvator boot.

In order to prevent blockage of the elevator system by a mass of pellets accumulating in the bottom of the boot in the event of an elevator stoppage, the inclination of the plate 26 must be steep enough to allow small or irregularly shaped pellets to slide down it but not so steep that flooding of the boot occurs if the elevator stops. In practice an inclination of 28° to the horizontal is found to be satisfactory. The aperture 25 is so arranged that the pellets pile up on the plate 26 and block if the elevator stops. The hopper 24 will than normally fill with pellets until the exit from the tail pipe is blocked.

As the pellets pass repeatedly through the decomposer, they grow progressively in size by deposition of nickel on them, and pellets that have grown to a predetermined size are segregated by causing them to overflow preferentially to the smaller pellets from a conical pile 27 at the top of the reservoir and over a dam 28 and down a helical chute 29 and a discharge pipe 30 on to a screen 31. Undersize pellets that have overflowed the dam pass through the screen and are returned to circulation via the pipe 32, while the fully-grown pellets pass over the screen into a product hopper 33 from which they are periodically removed.

For stable continuous operation in production of nickel pellets, the rate at which nickel is removed from circulation as fully-grown pellets must, of course, be the same as that at which nickel is deposited on the pellets in the reaction chamber. Moreover, while uniform heating and radial mixing of the pellets make an important contribution to stable operation, it is also important to ensure that effective seed particles i.e., particles large enough to act as growth nuclei instead of becoming incorporated in existing pellets or blown out of the reaction chamber with the exit gas, are introduced in the same numbers as product pellets are removed. Hence, if sufficient effective seed particles are not formed internally by breakage of existing pellets or otherwise, enough additional particles must be added, and if too many seed particles are found to be in circulation the excess must be removed, e.g., by an additional screening operation.

All carbonyl concentrations herein referred to are at 15° C and at atmospheric pressure.

Although the present invention has been described in conjunction with certain advantageous embodiments, it is to be understood that other embodiments, which also may be advantageous, and modifications and variations may be resorted to without departing from the spirit and scope of the invention, as those skilled in the art will readily understand. Such other embodiments, modifications and variations are considered to be within the purview and scope of the invention and appended claims.

I claim:

1. In a carbonyl pellet decomposer having a reaction chamber with a charging end and a discharging end, pellet feeding means for charging pellets to the charging end, pellet discharging means for removing pellets from the discharging end and carbonyl-containing gas feeding means a predetermined distance from the discharging end for feeding carbonyl-containing gas to the reaction chamber, the improvement which comprises carbonyl-containing gas withdrawal means a predetermined distance from the charging end for withdrawing a preponderant part of the carbonyl containing gas from the reaction chamber before all the carbonyl has been decomposed, gas outlet means nearer to the charging end than the withdrawal means for removing the remainder of the gas after substantially all the carbonyl has been decompsed to provide a carbonyl-free gas, gas inlet means near the discharging end for introducing the carbonyl-free gas into the reaction chamber to establish a flow of gases within the reactor from the pellet discharging end to the pellet charging end, and circulating means for circulating carbonyl-free gas from the gas outlet means to the gas inlet means.

2. The carbonyl pellet decomposer described in claim 1 wherein the reaction chamber is vertically disposed with the charging end being at the top and the discharging end being at the bottom.

3. The carbonyl pellet decomposer described in claim 2 wherein the reaction chamber is a cylindrical body with a narrow neck in the center of the top of the reactor through which pellets are fed.

4. The carbonyl pellet decomposer described in claim 3 wherein a plurality of said gas withdrawal means are placed on the shoulder of the reactor formed by the junction of the neck and the body of the reactor.

5. The carbonyl pellet decomposer described in claim 4 wherein the pellet feeding means include a conical baffle, apex upwards, in the neck of the reaction chamber and said gas outlet means is located in the conical baffle.

6. In a closed carbonyl pellet decomposer having pellet preheater means, pellet collecting means disposed below said preheater means, a reaction chamber disposed below said collecting means, radial mixing means disposed within said collector means and adapted to mix pellets of various sizes which pass from said preheater means to said reaction chamber and pellet recirculation means for recirculating pellets from said reaction chamber to said preheater means to said collecting means back to said reaction chamber; said reaction chamber having a charging end at its top, a discharging end at its bottom, and means for introducing a carbonyl-containing gas to said reaction chamber, the improvement comprising carbonyl-gas withdrawal means a predetermined distance from the charging end of the reaction chamber for withdrawing a preponderant part of the carbonyl-containing gas from the reaction chamber before all the carbonyl has been decomposed, gas outlet means nearer the charging end than said gas withdrawal means for removing the remainder of the gas after substantially all the carbonyl has been decomposed to provide a carbonyl-free gas, gas inlet means at the discharging end of the reaction vessel for introducing the carbonyl-free gas into the reaction chamber to provide a flow of gas in the reaction chamber from the discharging end to the charging end means for circulating carbonyl-free gas from said gas outlet means to said gas inlet means and means for removing pellets which are the product of said closed pellet decomposer.

7. The pellet decomposer described in claim 6 wherein the gas outlet means is located in said radial mixing means and a portion of the carbonyl-free gas introduced into the reaction chamber through said gas inlet means circulates through said pellet recirculating means to said pellet preheater means to said pellet collecting means to provide a back pressure at said radial mixing means whereby flow of carbonyl-containing gas between said gas withdrawal means and said gas outlet means is minimized.

* * * * *